J. H. & A. E. GILMAN.
BELT TIGHTENER FOR CONVEYERS.
APPLICATION FILED MAR. 7, 1917.
1,299,701.
Patented Apr. 8, 1919.
2 SHEETS—SHEET 1.
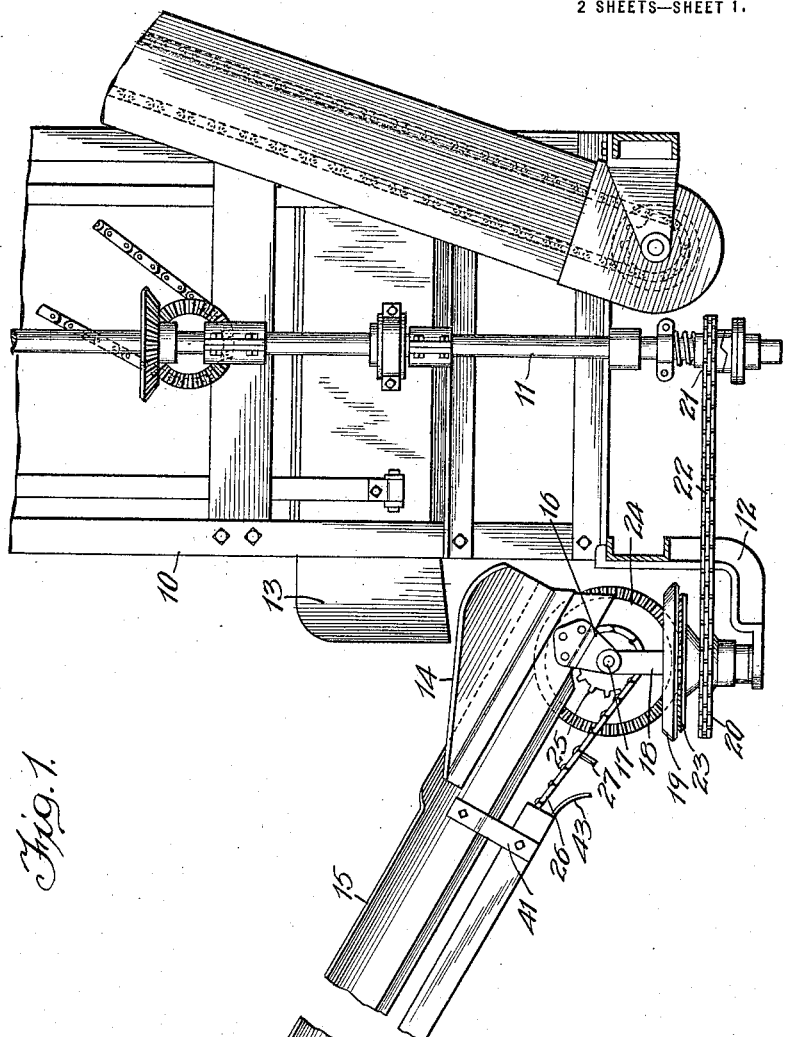
Fig. 1.
Witnesses:
W. F. Kilroy
Harry R. L. White
Inventors:
John H. Gilman
Albert E. Gilman
By John Howard McElroy
their Atty.
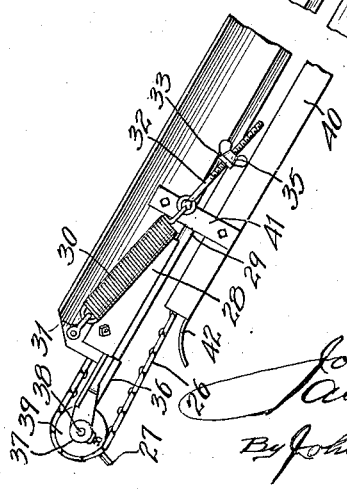

J. H. & A. E. GILMAN.
BELT TIGHTENER FOR CONVEYERS.
APPLICATION FILED MAR. 7, 1917.
1,299,701.
Patented Apr. 8, 1919.
2 SHEETS—SHEET 2.
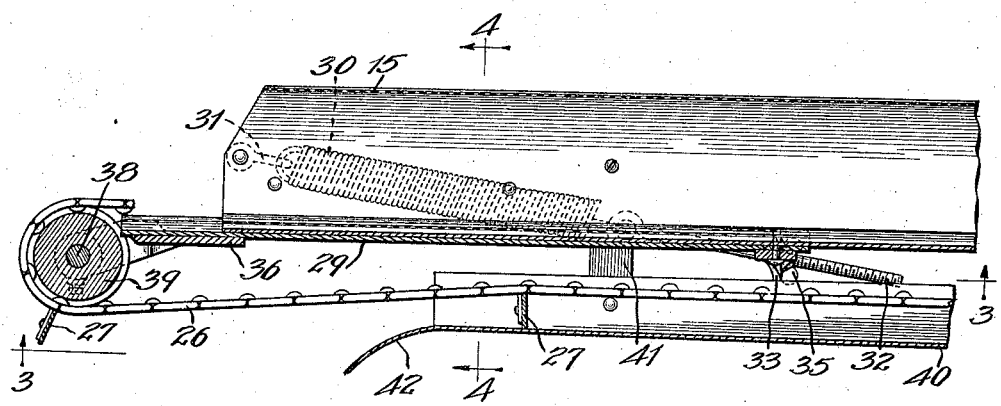
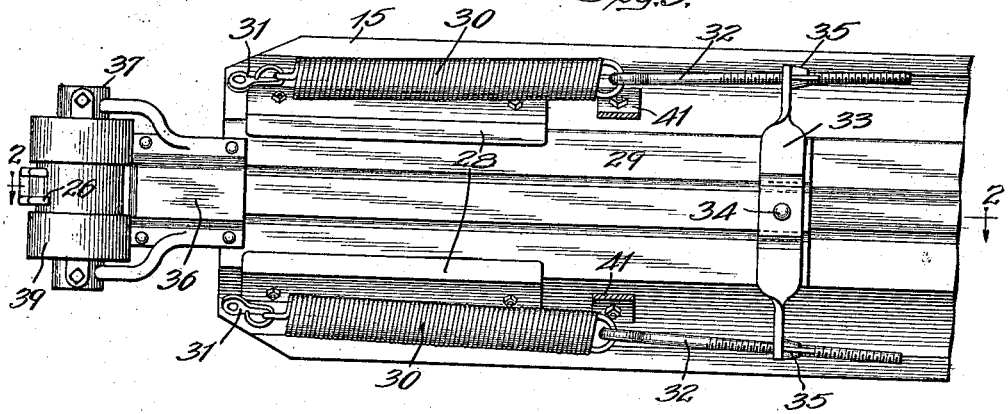
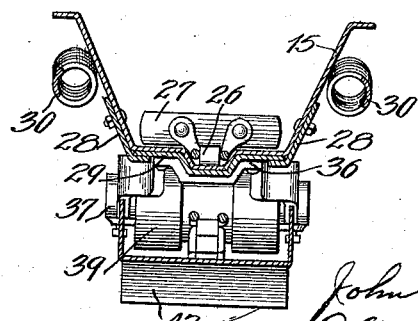

UNITED STATES PATENT OFFICE.

JOHN H. GILMAN AND ALBERT E. GILMAN, OF OTTAWA, ILLINOIS, ASSIGNORS TO KING & HAMILTON COMPANY, OF OTTAWA, ILLINOIS, A CORPORATION OF ILLINOIS.

BELT-TIGHTENER FOR CONVEYERS.

1,299,701.

Specification of Letters Patent.    Patented Apr. 8, 1919.

Application filed March 7, 1917.    Serial No. 153,122.

*To all whom it may concern:*

Be it known that we, JOHN H. GILMAN and ALBERT E. GILMAN, citizens of the United States, and residents of Ottawa, in the county of La Salle and State of Illinois, have invented certain new and useful Improvements in Belt-Tighteners for Conveyers, of which the following is a full, clear, and exact specification.

Our invention is concerned primarily with belt tighteners for corn-cob stackers and similar devices where an endless conveyer-chain, or chains, carrying scrapers, is run through a trough and driven from the lower end thereof, and is concerned with a novel form of belt tightener which we have found by experience is best adapted for such uses.

To illustrate our invention, we annex hereto two sheets of drawings, in which the same reference characters are used to designate identical parts in all the figures, of which,—

Figure 1 is a side elevation showing a portion of one end of a corn-shelling machine with a cob-stacker having our improved belt tightener applied thereto;

Fig. 2 is a central vertical section through the upper end of the stacker, on an enlarged scale;

Fig. 3 is an inverted plan view of the same, with the return trough removed, it being substantially in section on the line 3—3 of Fig. 2; and Fig. 4 is a section on the line 4—4 of Fig. 2.

We have shown our invention as applied to a corn-sheller, in which 10 is the main frame, in one end of which a vertically-mounted driven shaft 11 rotates. Suitably mounted on a bracket 12 so that the discharge end of the cob-screen 13 will deliver the cobs into the hopper 14, is the cob-stacker, which consists primarily of a sheet-metal trough 15 of the shape best shown in cross section in Fig. 4. This trough 15 has the hopper 14 secured at the top of its lower end, with a pair of bearing lugs 16 riveted on either side of the lower end of the bottom so that the trough is fulcrumed on the drive shaft 17, which is journaled in a pair of ears 18 extending upwardly from the cover plate 19, which is secured on the supporting stud (not shown) projecting up vertically from the outer end of the bracket 12 through the center of the hub of the driven sprocket-wheel 20. In the form shown, the driven shaft 11 has suitably clutched on its lower end a sprocket pinion 21 connected by a sprocket chain 22 with the aforesaid sprocket-wheel 20, so that as the sheller operates, the cob-conveyer is driven through the described gearing. The sprocket wheel 20 has rigidly secured thereto the bevel gear wheel 23, which meshes with the bevel gear wheel 24 secured on the farther end of the shaft 17 already described, which has secured thereon at the center of the trough the sprocket wheel 25, over which runs the sprocket chain 26 carrying the scraper bars 27.

At the under side of the upper end of the trough 15 are bolted or riveted a pair of angular sheet-metal plates 28, which, coöperating with the bottom of the trough, form guides for the plate 29 sliding beneath the upper end of the trough. This plate is held thrust outward under spring pressure by a pair of helically-coiled contractile springs 30 which have their upper ends held by the hooks 31 secured to the upper end of the outside of the trough 15. Their inner ends are secured to the eye-bolts 32, which have their threaded ends extending through apertures in the equalizing bar 33 which is pivoted at 34 to the under side of the lower end of the plate 29. It may be noted, as a matter of description, that the under side of the plate 29 is provided with a central longitudinal groove to accommodate the corresponding central longitudinal groove formed in the bottom of the trough to accommodate the chain 26. The wing-nuts 35 screwed on the ends of the eye-bolts 32 serve to regulate the tension of the springs 30. Riveted to the under side of the upper end of the plate 29 is the forked casting 36, which has the bearing ears 37 in which is secured the shaft 38, on which the centrally-grooved roller 39 is journaled, the central groove being to accommodate the links of the chain 26. With the construction shown, it will be obvious that the tension of the springs 30 tends to thrust the roller 39 outward along the length of the trough, thus adding to the functions of this roller that of being a belt-tightener to keep the chain 26 taut throughout its run. As already pointed out, with this construction of belt-tightener, the tension of the chain is substantially the same on both runs despite the fact that it is driven from the lower end, and no difficulty is found with cobs getting between the under side of the top run of the chain and the bottom of the trough.

To prevent the chain on its return run from acting on the cobs beneath it and tending to tear down the pile accumulated, we preferably provide a shallow return-trough 40, which is constructed of sheet-metal and is secured in place by riveting it to the bars 41, which in turn are riveted to the sides of the trough 15. The sides of the return trough are cut away at the ends 42 and 43, which are turned outward as shown, and these ends terminate short of the ends of the trough 15 at both the top and bottom. The return trough is made shorter at the upper end to prevent the liability of cobs getting between the chain and the top of the return trough at the upper end, and it is shorter than the main trough at the lower end, so that if any cobs should get between the chain and the return trough, they will drop out before reaching the gearing at the lower end.

While we have shown and described our invention as embodied in the form which we at present consider best adapted to carry out its purposes, it will be understood that it is capable of some modifications, and that we do not desire to be limited in the interpretation of the following claims except as may be necessitated by the state of the prior art.

What we claim as new, and desire to secure by Letters Patent of the United States, is:

1. In a belt tightener, the combination with a stationary member provided with a guide way, of a movable member sliding in said way, an equalizing bar pivoted to the movable member, and a pair of springs acting on the ends of said bar.

2. In a belt tightener, the combination with a stationary member provided with a guide way, of a movable member sliding in said way, an equalizing bar pivoted to the movable member, a pair of springs acting on the ends of said bar, and means for adjusting the tension of said springs.

3. In a belt tightener, the combination with a stationary member provided with a guide way, of a movable member sliding in said way, an equalizing bar pivoted to the movable member, a pair of helically coiled contractile springs secured at one end to the stationary member, hook rods secured to the other ends of said springs at one end and having their other ends threaded and passed through apertures in the ends of the equalizing bar, and nuts on said threaded ends engaging the equalizing bar.

In witness whereof, we have hereunto set our hands and affixed our seals, this 3rd day of March, A. D. 1917.

JOHN H. GILMAN. [L. S.]
ALBERT E. GILMAN. [L. S.]

Witnesses:
AUGUST LEDRICH,
FRED E. IRION.

Copies of this patent may be obtained for five cents each, by addressing the "Commissioner of Patents, Washington, D. C."